United States Patent
Nakazawa

(10) Patent No.: US 8,180,418 B2
(45) Date of Patent: May 15, 2012

(54) HINGE APPARATUS AND PORTABLE ELECTRONIC DEVICE

(75) Inventor: Yuko Nakazawa, Katsushika-ku (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 394 days.

(21) Appl. No.: 12/398,080

(22) Filed: Mar. 4, 2009

(65) Prior Publication Data

US 2009/0221335 A1 Sep. 3, 2009

(30) Foreign Application Priority Data

Mar. 3, 2008 (JP) .................. 2008-052144

(51) Int. Cl.
*H04M 1/00* (2006.01)
(52) U.S. Cl. ............... 455/575.4; 455/550.1; 455/575.3
(58) Field of Classification Search ............ 455/550.1, 455/575.1, 575.3, 575.4; 361/814
See application file for complete search history.

(56) References Cited

U.S. PATENT DOCUMENTS

| 5,291,370 | A |   | 3/1994 | Yanagisawa et al. |
| 5,657,370 | A | * | 8/1997 | Tsugane et al. ............. 455/566 |
| 6,892,082 | B2 | * | 5/2005 | Boesen ..................... 455/575.3 |
| 2006/0114646 | A1 |  | 6/2006 | Koibuchi et al. |
| 2008/0261666 | A1 |  | 10/2008 | Niitsu et al. |

FOREIGN PATENT DOCUMENTS

| JP |   | 5-143191 |   | 6/1993 |
| JP |   | 11-030226 |   | 2/1999 |
| JP |   | 11-175188 |   | 7/1999 |
| JP |   | 2003-174495 |   | 6/2003 |
| JP |   | 2007-081804 |   | 3/2007 |
| JP |   | 2007081804 | A * | 3/2007 |
| JP |   | 2007-116709 |   | 5/2007 |

* cited by examiner

*Primary Examiner* — Anh Tran
(74) *Attorney, Agent, or Firm* — Cozen O'Connor

(57) ABSTRACT

A hinge apparatus includes a hinge unit that pivotably links a first housing and a second housing about a pivot axis, and a slide mechanism that enables the hinge unit to slide with respect to the second housing in a direction perpendicular to the pivot axis of the hinge unit on one face of the second housing. A portable electronic device includes the first housing, the second housing, and the hinge apparatus.

12 Claims, 7 Drawing Sheets

HINGE APPARATUS AND PORTABLE ELECTRONIC DEVICE

BACKGROUND OF THE INVENTION

1. Field of the Invention

The present invention relates to a hinge apparatus that foldably and slidably links a first housing and a second housing, and a portable electronic device including the hinge apparatus.

2. Description of the Related Art

In recent years, forms of portable electronic devices are diversified. Mobile telephones are typical examples of portable electronic devices. Conventional forms of a mobile telephone include a slide-type mobile telephone having two housings linked linearly slidably, and a fold-type mobile telephone having two housings linked by a hinge.

A slide-type mobile telephone can be folded up compactly by sliding and overlaying the two slidably linked housings. Generally, a first housing includes a display unit on an upper face thereof and slides along an upper face of a second housing, which includes an operation unit having multiple keys on the upper face thereof. Accordingly, the display unit is revealed constantly to an exterior; and the operation unit is revealed or hidden by sliding the first and second housings. Many slide-type mobile telephones can be operated even in a folded state by including operation keys disposed beside the display unit on the upper face of the first housing, or by including a touch panel display unit. Thus, the slide-type mobile telephone has excellent operability because the slide operation and the key operation can be easily performed even with one hand.

On the other hand, a fold-type mobile telephone can be folded up compactly by folding and overlaying two housings linked by a hinge. Generally, the fold-type mobile telephone can be folded such that a display unit provided on the first housing and an operation unit provided on the second housing face each other for protection. Further, mobile telephones disclosed in Unexamined Japanese Patent Application KOKAI Publication No. H11-30226 and Unexamined Japanese Patent Application KOKAI Publication No. 2003-174495 include two housings linked by a double-axis hinge. Thereby, the first housing and the second housing can be mutually pivoted; and additionally, the first housing can be rotated around a second axis perpendicular to the pivot axis. Accordingly, the fold-type mobile telephone including a double-axis hinge has diversity of form; including, for example, folded form with the display unit facing to the exterior.

Also, in a portable terminal disclosed in Unexamined Japanese Patent Application KOKAI Publication No. 2007-116709, a first housing and a slide module provided on a second housing are linked by a hinge, and a pivot axis of the hinge is arranged parallel to a sliding direction of the slide module. Thereby, the first housing and the second housing can be mutually pivoted; and additionally, the first housing and the hinge can be slid with respect to the second housing in a pivot axis direction.

However, a fold-type mobile telephone using a double-axis hinge has poor operability in comparison to a slide-type mobile telephone. In other words, in a fold-type mobile telephone using a double-axis hinge, it is difficult to change the form with one hand; and when the mobile telephone is folded with the display unit facing the exterior, the screen display is vertically inverted. Further, employing a double-axis hinge results in a large hinge unit. Also, the portable terminal using the hinge and the slide module described above has problems of a complex structure of the slide module and a large housing.

SUMMARY OF THE INVENTION

In consideration of the conventional problems recited above, the objects of the present invention are to provide a simple hinge apparatus having a structure that foldably and slidably links two housings, and further to provide a portable electronic device having diversity of form and excellent operability.

To achieve the objects recited above, a hinge apparatus according to the present invention comprises:

a hinge unit that pivotably links a first housing and a second housing about a pivot axis; and a slide mechanism that enables the hinge unit to slide with respect to the second housing in a direction perpendicular to the pivot axis of the hinge unit, on one face of the second housing.

A portable electronic device according to the present invention comprises the first and second housings and the hinge apparatus, which are as described above.

EFFECT OF THE INVENTION

According to the present invention, it is possible to provide a portable electronic device having a simple and compact structure, with diversity of form and excellent operability.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Figure 1A:
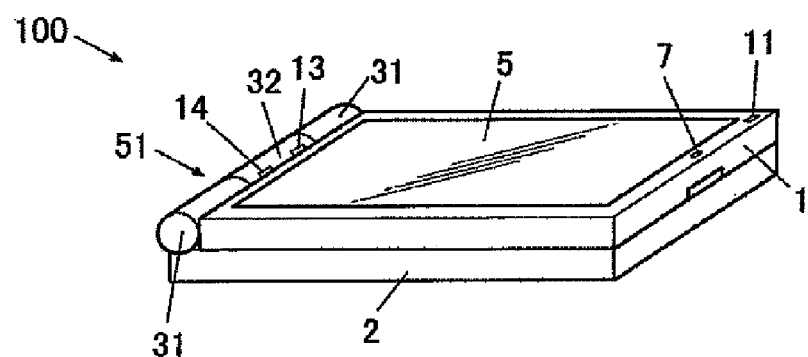
FIGS. 1A to 1E are perspective views illustrating a mobile telephone according to an embodiment 1 of the present invention.

The embodiments of the present invention will be described hereinafter with reference to the drawings.

Embodiment 1

As illustrated in FIGS. 1A to 1E, a mobile telephone 100 according to an embodiment 1 includes a first housing 1, a second housing 2, and a hinge apparatus 51 that links the first housing 1 and the second housing 2. The first housing 1 includes a display unit 5 and an earpiece unit 7; and the second housing 2 includes an operation unit 6 and a mouthpiece unit 8, as main components of a mobile telephone. The mobile telephone 100 also has a function to control the display unit 5 in accordance with the form of the mobile telephone 100, details of which are described below.

Figure 1B:
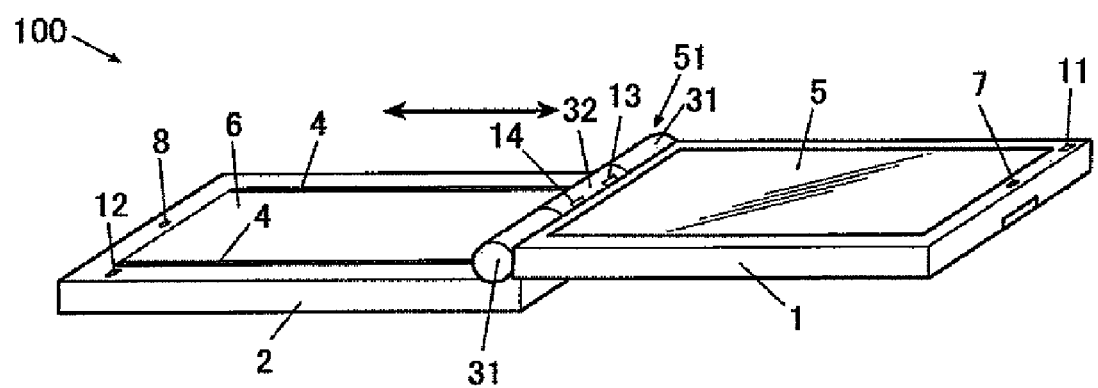
Figure 1C:
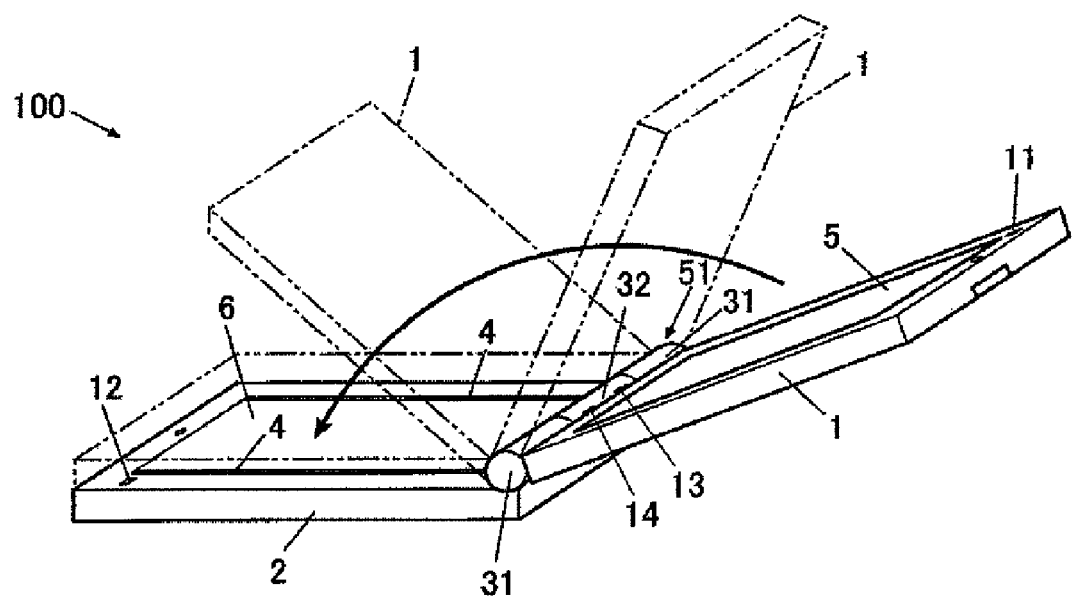
Figure 1D:
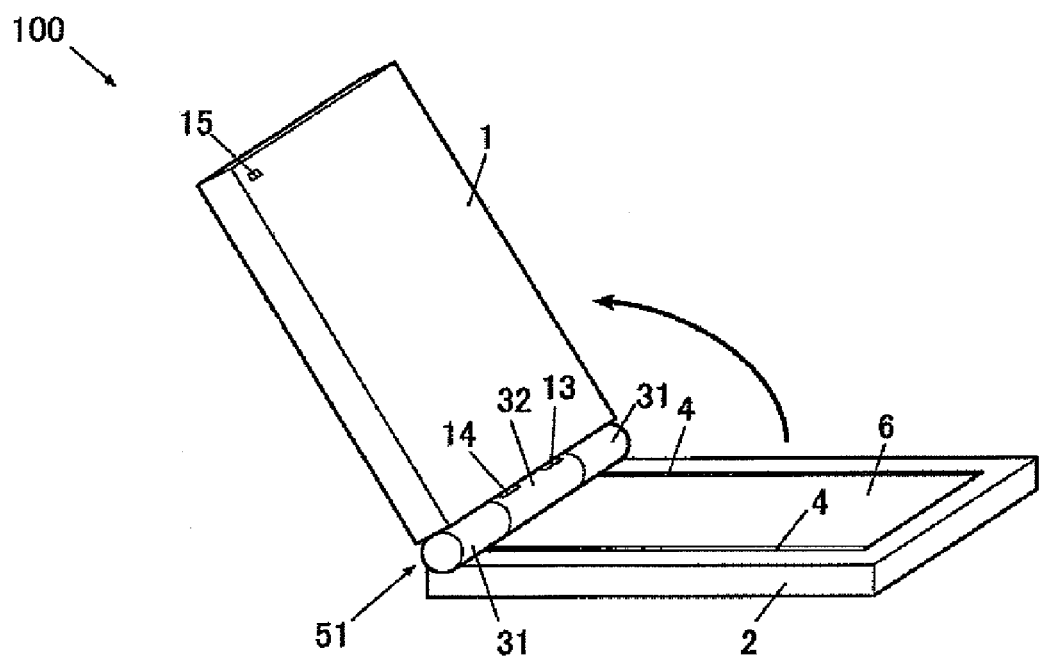
Figure 1E:
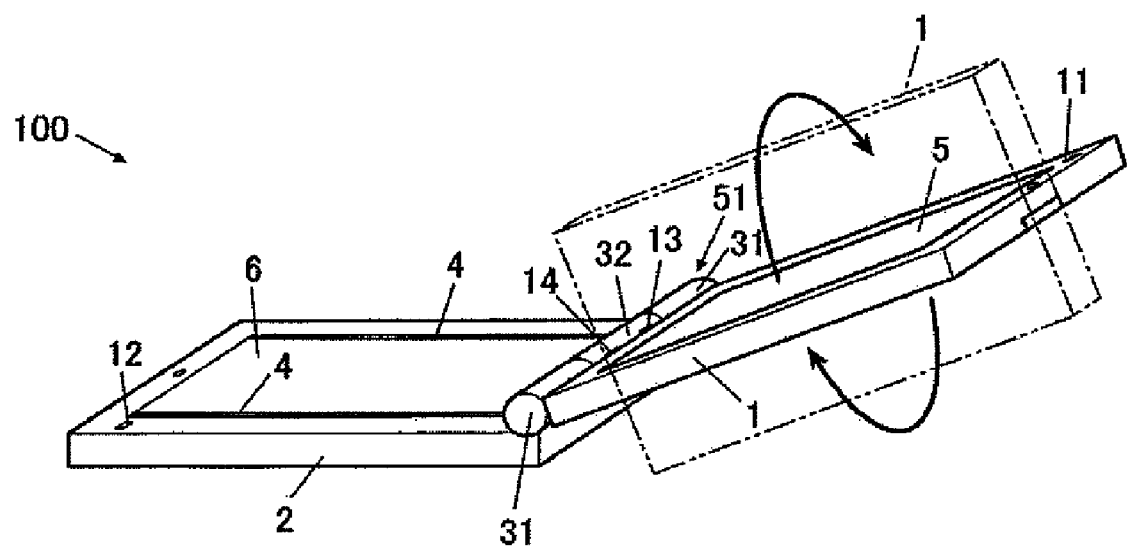
Figure 1F:
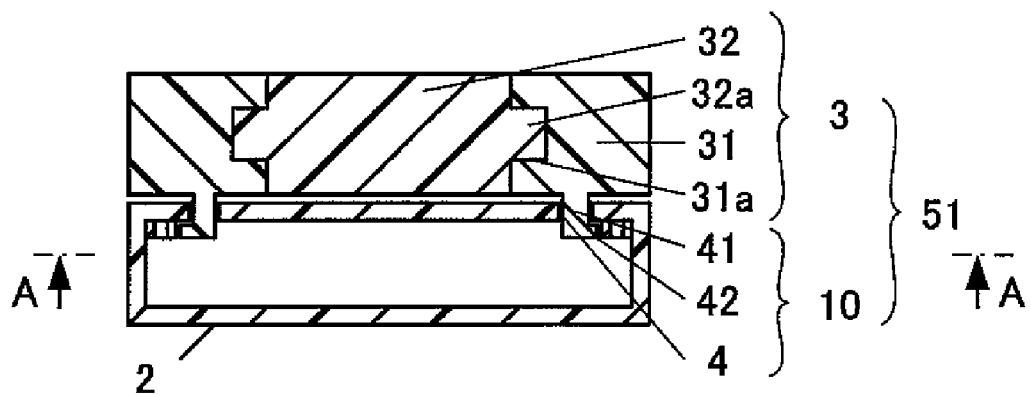
FIG. 1F is a cross-sectional view illustrating a hinge unit and a slide mechanism of the hinge apparatus according to the embodiment 1 of the present invention.

As illustrated in FIG. 1F, the hinge apparatus 51 includes a hinge unit 3 that makes the first housing 1 and the second housing 2 mutually pivotable, and a slide mechanism 10 that makes the first housing 1 and the second housing 2 mutually slidable.

The hinge unit 3 includes a hinge axis 32 linked to the first housing 1 and a pair of hinge members 31 linked to the second housing 2. Circular columnar axis portions 32a are formed on both ends of the hinge axis 32. Bearing portions 31a corresponding to the axis portions 32a are formed on end faces of the pair of hinge members 31. The axis portions 32a are inserted into the pair of the bearing portions 31a; and thereby, the hinge axis 32 is pivotably held between the pair of hinge members 31. Accordingly, the first housing 1 is pivotable with respect to the hinge members 31. The hinge members 31 and the hinge axis 32 may be pivotably supported by a pivot extending along the pivot central axis.

The hinge unit 3 may include a pivot urge mechanism, not illustrated, that urges the first housing 1 and the second housing 2 in a pivot direction. The pivot urge mechanism may enable the first housing 1 and the second housing 2 to be stably stationary at a position halfway through the pivot stroke thereof.

As illustrated in FIG. 1F, the slide mechanism 10 includes slide portions 41 formed on the pair of hinge members 31, engagement portions 42 formed on the slide portions 41, and a pair of rails 4 formed in an upper face of the second housing 2. The rails 4 are slits, formed in a direction perpendicular to the pivot axis of the hinge unit 3 on both side of the operation unit 6. The slide portions 41 formed on the hinge members 31 are inserted in the rails 4, and are engaged in the rails 4 to prevent removal by the engagement portions 42 formed on the slide portions 41. Also, the rails 4 are running nearly the full length of the upper face of the second housing 2; and faces defining both ends of the rails 4 form stoppers that contact the slide portions 41. Accordingly, the hinge members 31 are slidable to nearly traverse the upper face of the second housing 2 longitudinally along the rails 4.

Figure 1G:
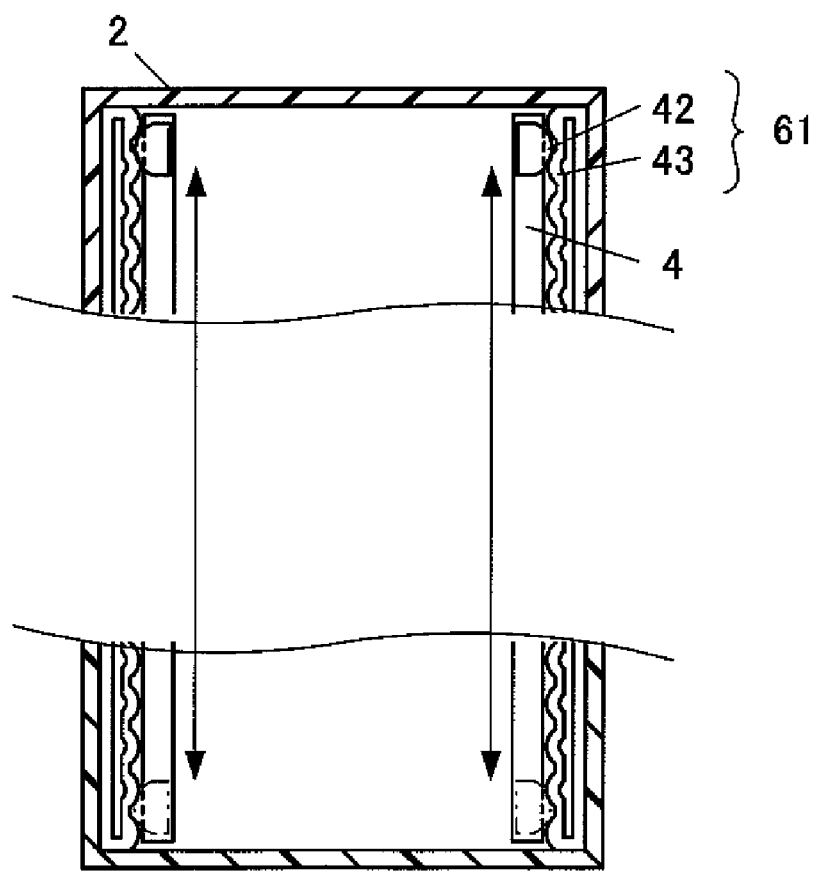
FIG. 1G is an auxiliary cross-sectional view taken along the line A-A of FIG. 1F.

In the slide mechanism 10, the first housing 1 can be stationary at a position halfway through the slide stroke thereof by, for example, sliding resistance occurring between the slide portions 41 and/or the engagement portions 42 and the rails 4 and/or an inner face of the second housing 2. To create the sliding resistance, for example, simple friction between members, a latching unit, or the like may be utilized. A slide latch mechanism 61 illustrated in FIG. 1G utilizes a shape of recessions and protrusions of slide latch members 43 formed of a resin to latch the engagement portions 42 formed on the slide portions 41, and regulates the slide of the first housing 1. Also, the recessed and protruding portions of the slide latch members 43 deform by a sliding force not less than a fixed amount; and thereby, the first housing 1 is slidable.

As described hereinbefore, the first housing 1 and the second housing 2 are linked pivotably and slidably in the direction perpendicular to the pivot axis by the hinge apparatus 51 (namely, the hinge unit 3 and the slide mechanism 10). The first housing 1 and the second housing 2 can be stationary at a position halfway through the slide stroke thereof. Also, the first housing 1 and the second housing 2 are not impeded from pivoting even halfway through the slide stroke thereof. Accordingly, the mobile telephone 100 can be used in the desired slide position and pivot position.

Further, as illustrated in further FIG. 1E, the hinge unit 3 is a double-axis hinge that links the first housing 1 rotatably around a rotational axis perpendicular to the pivot axis. In other words, the hinge axis 32 includes a rotational shaft, not illustrated, extending in a direction perpendicular to the pivot axis of the hinge unit 3 and links the first housing 1 rotatably around the rotational axis. Accordingly, the first housing 1 and the display unit 5 of the first housing 1 can be rotated 180° around the rotational axis.

At least one of the slide portion 41, the hinge member 31, the hinge axis 32, and the rotational shaft, not illustrated, of the hinge unit 3 may include a wiring path, not illustrated, in an interior thereof. A lead wire, not illustrated, may pass through the rail 4 and/or the wiring path to be arranged between the first housing 1 and the second housing 2.

Figure 1H:
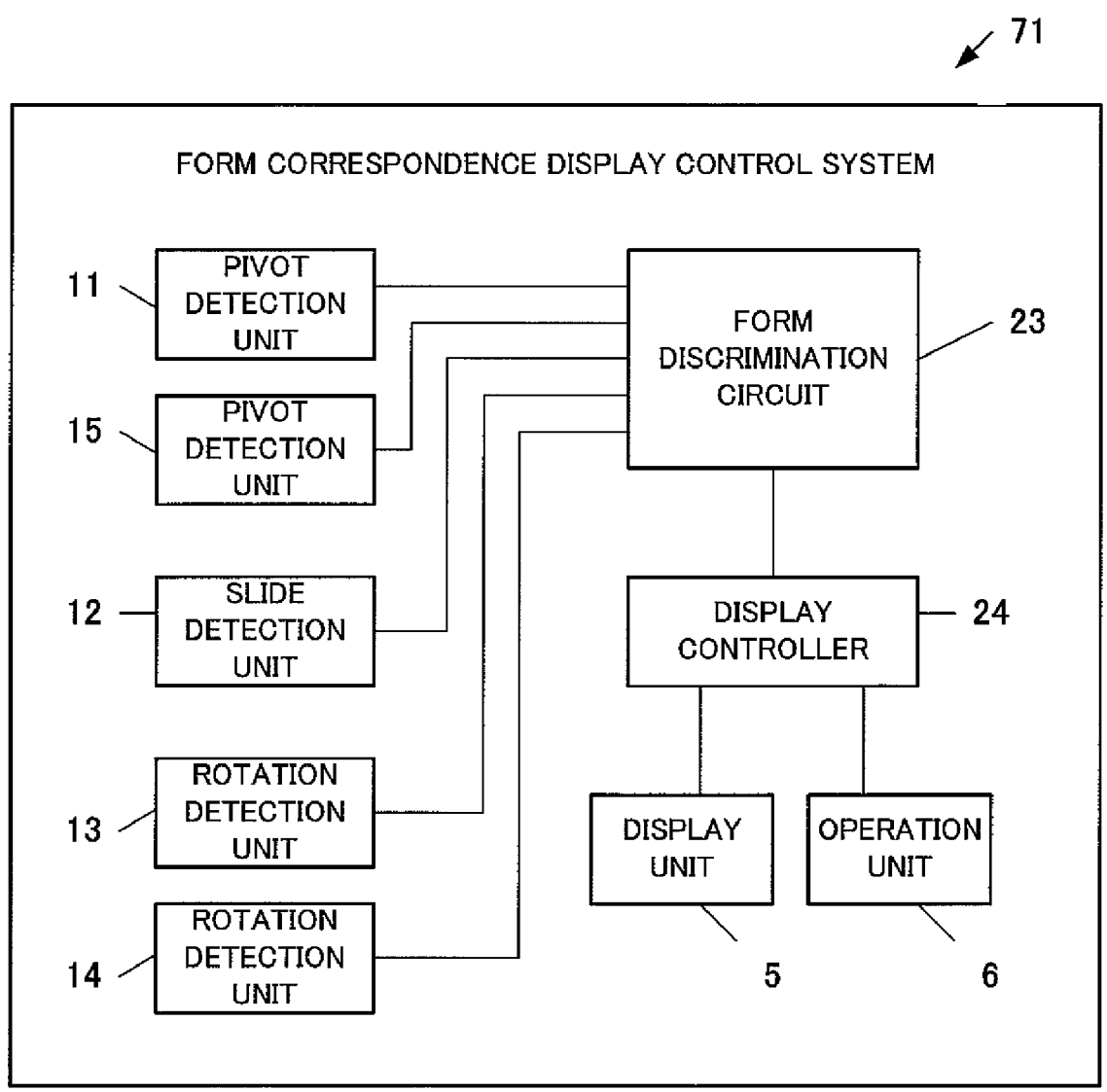
FIG. 1H is a block diagram illustrating a form correspondence display control system according to the embodiment 1 of the present invention.

Next, a function that controls the display unit 5 in accordance with the form of the mobile telephone 100 is described. The relevant function is realized by a form correspondence display control system 71 illustrated in FIG. 1H. The form correspondence display control system 71 includes pivot detection units 11 and 15, a slide detection unit 12, rotation detection units 13 and 14, a form discrimination circuit 23, a display controller 24, the display unit 5, and the operation unit 6.

As illustrated in FIG. 1A and other drawings, a pivot detection unit 11 is provided on a face having the display unit 5 of the first housing 1; a pivot detection unit 15 is provided on an opposite face thereof; and each is disposed on an end portion distal to the hinge unit 3. The pivot detection units 11 and 15 detect the absence or presence of contact with the face having operation unit 6 of the second housing 2; are switches or sensors that output detection signals (ON/OFF) thereof; and are used for discriminating a relative pivot position of the first housing 1 and the second housing 2 around the pivot axis. The detection signals from the pivot detection units 11 and 15 are input to the form discrimination circuit 23.

Also, as illustrated in FIG. 1B and other drawings, the slide detection unit 12 is provided on the face of the second housing 2 that includes the operation unit 6, and specifically, at a position where the hinge member 31 of the hinge unit 3 is positioned in a state that the display unit 5 of the first housing 1 faces the exterior and the operation unit 6 of the second housing 2 is closed (a so-called view style). The slide detection unit 12 detects the absence or presence of contact with the hinge member 31 of the hinge unit 3; is a switch or sensor that outputs a detection signal (ON/OFF) thereof; and is used for discriminating a relative slide position of the first housing 1 and the second housing 2. The detection signal from the slide detection unit 12 is input to the form discrimination circuit 23.

Further, as illustrated in FIG. 1A and other drawings, the rotation detection units 13 and 14 are provided on a surface of the hinge axis 32 of the hinge unit 3, and specifically, opposed to the first housing 1 and at positions offset 180° each with respect to the rotational axis of the double-axis hinge. The rotation detection units 13 and 14 detect an absence or presence of contact with, for example, a protrusion, magnet, or other portion for detection, not illustrated, provided on the first housing 1; are switches or sensors that output detection signals (ON/OFF) thereof; and are used for detecting the relative rotation position of the first housing 1 and the second housing 2 around the rotational axis. The detection signals from the rotation detection units 13 and 14 are input to the form discrimination circuit 23.

The form discrimination circuit 23 is provided on a main substrate which is not illustrated. The form discrimination circuit 23 is a circuit that discriminates a form of the mobile telephone 100 in accordance with the detection results of the pivot detection units 11 and 15 and the slide detection unit 12, and is used for controlling a screen display of the display unit 5. Accordingly, the form discrimination circuit 23 is connected to the display controller 24.

The display controller 24 also is provided on the main substrate. The display controller 24 is a circuit that controls a screen display of the display unit 5 in accordance with the form of the mobile telephone 100 discriminated by the form discrimination circuit 23.

The display unit 5 provided on the upper face of the first housing 1 includes, for example, a touch panel having a touch sensor provided on a liquid crystal display panel, and functions also as an operation unit. Also, the operation unit 6 provided on the upper face of the second housing 2 includes a touch panel similar to that of the display unit 5, functions as a second display unit, and is controlled by the form correspondence display control system 71.

Figure 1I:
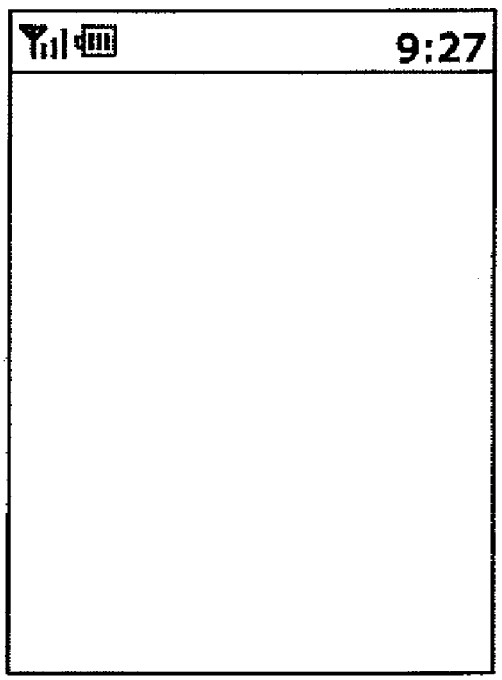
FIGS. 1I to 1K illustrate screen displays of a display unit of the form correspondence display control system.
Figure 1J:
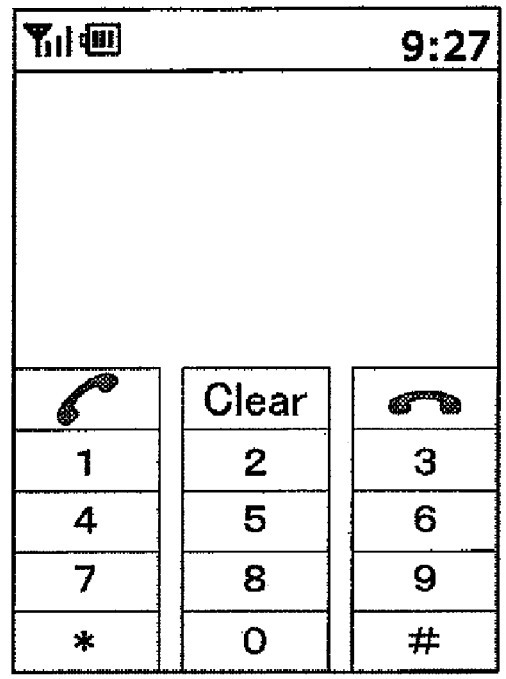
Figure 1K:
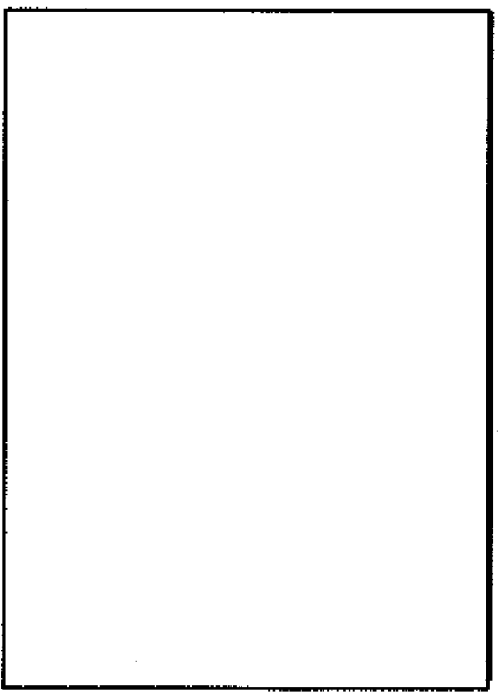

Using FIGS. 1I to 1K, screen display examples of the display unit 5 by a control of the form correspondence display control system 71 are described. When the mobile telephone 100 is in an opened state (for example, the state illustrated in FIG. 1B or FIG. 1D), the pivot detection units 11 and 15 each output an OFF signal. Then, by controls of the form discrimination circuit 23 and the display controller 24, the display unit 5 displays a stand-by screen as illustrated in FIG. 1I. Also, when the mobile telephone 100 is in a closed state in which the display unit 5 of the first housing 1 faces the exterior (for example, the state illustrated in FIG. 1A, view style), the pivot detection unit 11 outputs an OFF signal; and the pivot detection unit 15 outputs an ON signal. Then, as illustrated in FIG. 1J, the display unit 5 displays a stand-by screen on an upper half and displays a dial ten key screen for operations enabled by a touch panel on a lower half. Further, when the mobile telephone 100 is closed with the display unit 5 of the first housing 1 and the operation unit 6 of the second housing 2 facing each other, the pivot detection unit 11 outputs an ON signal; and the pivot detection unit 15 outputs an OFF signal. Then, the display unit 5 enters an OFF state as illustrated in FIG. 1K.

The form correspondence display control system 71 similarly controls a screen display of the operation unit 6 of the second housing 2. Further, the display direction, display content, ON/OFF state, and the like of the display unit 5 and the operation unit 6 are appropriately controlled in accordance with the detection signals of the slide detection unit 12 and the rotation detection units 13 and 14.

The quantities of pivot detection units 11 and 15, slide detection units 12, and rotation detection units 13 and 14 may be increased or decreased; and the positions thereof may be changed as necessary.

As described hereinbefore, the mobile telephone 100 of this embodiment employs the hinge apparatus 51 that includes the hinge unit 3, which makes the first housing 1 and the second housing 2 pivotable, and the slide mechanism 10, which makes the first housing 1 and the second housing 2 slidable with the hinge unit 3 in the direction perpendicular to the pivot axis. Accordingly, the mobile telephone 100 includes a hinge apparatus 51 having a simple structure; and has excellent operability and changeability of form to accommodate diverse purposes.

Specifically, the mobile telephone 100 can be folded with the display unit 5 and the operation unit 6 being in a mutually opposed manner for protection thereof because display unit 5 and operation unit 6 are provided on the respective upper faces of the first housing 1 and the second housing 2. Further, the first housing 1 and the second housing 2 can be mutually slid with the display unit 5 facing the exterior. Accordingly, the disadvantage of mobile telephones utilizing conventional double-axis hinges, in which the screen display in the view style is vertically inverted, is overcome. Therefore, detection mechanisms and software processing, which are necessary for screen display inversion in a conventional mobile telephone using a double-axis hinge, are unnecessary. Further, these form operations can be easily performed with one hand. Furthermore, the hinge apparatus 51 can easily provide a size reduction in comparison to conventional double-axis hinges.

Also, by using a double-axis hinge as the hinge unit 3, more diverse form changes are possible.

Further, relative position of the first housing 1 and the second housing 2 are detected by the pivot detection units 11 and 15, the slide detection unit 12, and the rotation detection units 13 and 14. Then, the switching of the display functions and the operation functions of the mobile telephone 100 are controlled in accordance with the detection results. Accordingly, it is possible to utilize appropriate display and operation functions in accordance with diverse forms.

Also, the operation unit 6 of the second housing 2 includes a touch panel and also functions as a second display unit. Accordingly, the operation unit 6 can cooperate with the display unit 5 of the first housing 1 to, for example, continuously display Long mail messages, long Web pages, etc.; or to simultaneously display related multiple information.

Further, the first housing 1 and the second housing 2 can be stationary and pivoted even halfway through the slide stroke thereof. Accordingly, changeability of forms with greater flexibility can be realized.

Embodiment 2

The configurations of the hinge unit 3 and the slide mechanism 10 of a mobile telephone 200 according to an embodiment 2 are different from those of the mobile telephone 100. Also, in the mobile telephone 200, electronic circuits contained in a first housing 1 and a second housing 2 are electrically connected by a lead wire 9.

Figure 2A:
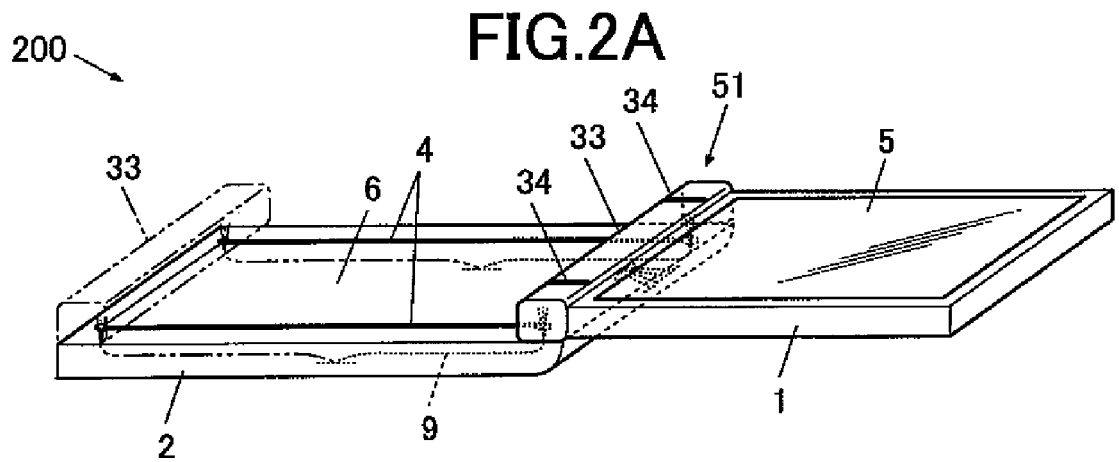
FIG. 2A is a perspective view illustrating a mobile telephone according to an embodiment 2 of the present invention.
Figure 2B:
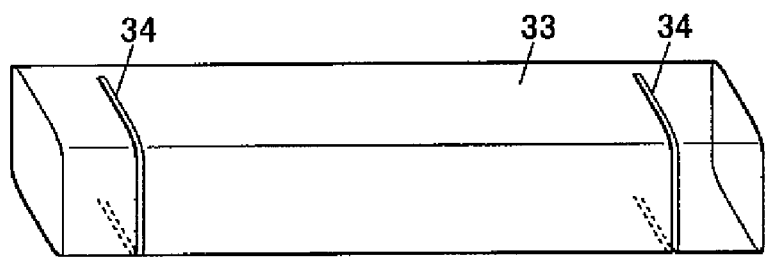
FIG. 2B is a perspective view illustrating a pipe member of a hinge apparatus according to the embodiment 2 of the present invention.
Figure 2C:
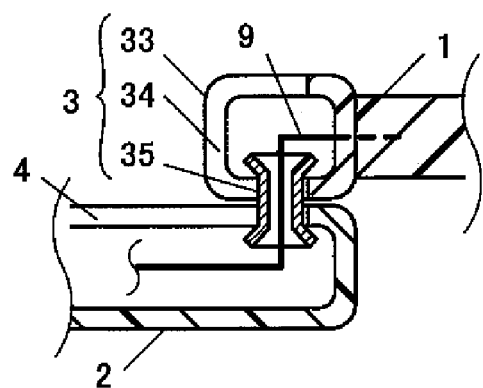
FIG. 2C is a cross-sectional view illustrating a hinge unit of the hinge apparatus according to the embodiment 2 of the present invention.
Figure 2D:
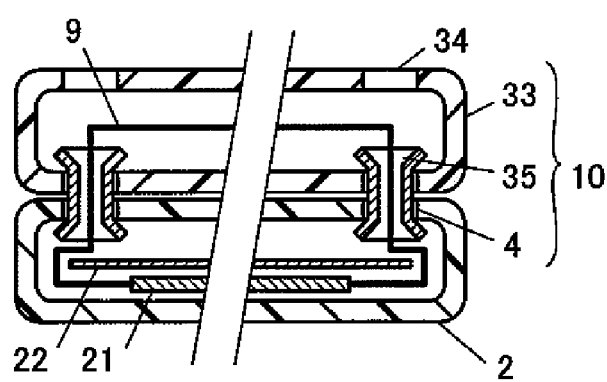
FIG. 2D is a cross-sectional view illustrating a slide mechanism of the hinge apparatus according to the embodiment 2 of the present invention.

As can be understood by considering FIGS. 2A to 2D, the hinge unit 3 of the mobile telephone 200 includes a pipe member 33 linked to the first housing 1 and a pair of hollow engagement members 35 linked to the pipe member 33. The pipe member 33 is a rectangular parallelepiped hollow member. As illustrated in FIG. 2B, a pair of rail 34 are slits formed in the pipe member 33. Also, as illustrated in FIGS. 2C and 2D, each of the pair of hollow engagement members 35 is a cylindrical member having spreading portions at both ends. One end of the each hollow engagement member 35 is inserted to engage with each of the pair of rails 34 formed in the pipe member 33, and thereby is attached to the pipe member 33. Accordingly, the hollow engagement members 35 can move on an outer circumference of the pipe member 33 along the rails 34. The other end of the each hollow engagement member 35 is slidably mounted in each of the pair of rails 4, which are slits formed in the upper face of the second housing 2.

The slide mechanism 10 of the mobile telephone 200 includes the pipe member 33 and the hollow engagement members 35, and the pair of rails 4 formed in the second housing 2 described above. The rails 4 are slits formed on both side of the operation unit 6 provided on the upper face of the second housing 2. Then, one ends of the hollow engagement members 35 are attached to the pipe member 33, and the other ends of the hollow engagement members 35 are inserted into the rails 4 to engage; and thereby, the pipe member 33 is slidable on the surface of the second housing 2 along the rails 4 without dropping off.

As is clear from the descriptions hereinabove, the hinge unit 3 of the mobile telephone 200 according to this embodiment includes the pipe member 33, the rails 34, and the hollow engagement members 35. Also, the slide mechanism 10 includes the pipe member 33, the hollow engagement members 35, and the rails 4. Accordingly, the first housing 1 is pivotable and slidable with respect to the second housing 2.

Similar to the embodiment 1, the hinge unit 3 is a double-axis hinge. In other words, the pipe member 33 includes a rotational shaft, not illustrated, which is perpendicular to the longitudinal direction thereof, and links the first housing 1 rotatably around the rotational axis.

As described above, in this embodiment, the first housing 1 and the second housing 2 are linked by the hollow engagement members 35. Accordingly, as illustrated in FIG. 2C and FIG. 2D, the lead wire 9 that electrically connects the electronic circuits provided in the first housing 1 and the second housing 2 can be disposed in an interior of the hollow engagement members 35. The lead wire 9 is connected to, for example, a main circuit substrate 21 in the second housing 2. Further, the lead wire 9 passes through an interior of the pipe member 33 and an interior of the rotational shaft, not illustrated, of the hinge unit 3 into the first housing 1, and connects to a circuit substrate and the like, not illustrated, contained in the first housing 1.

A blindfold plate 22 is disposed in the interior of the second housing 2. The blindfold plate 22 prevents visual confirmation of the main circuit substrate 21 via the rails 4.

Hereinabove, according to the mobile telephone 200 of the embodiment 2, similar functional effects as those of the embodiment 1 described above are obtained. Additionally, it is possible to pass the lead wire 9, which is arranged between the first housing 1 and the second housing 2, through the hollow engagement members 35, which straddle and engage with the rails 4 of the second housing 2 and the rails 34 of the pipe member 33 of the hinge unit 3.

Modifications

Electronic devices in the embodiments recited above are mobile telephones; but the present invention is not limited thereto, and may be used in all fold-type or slide-type portable electronic devices such as a calculator, electronic dictionary, digital camera, video camcorder, PDA, notebook-sized personal computer, or wearable personal computer.

Also, in the embodiments recited above, the hinge unit is illustrated to be disposed along a short side of the housing; but the hinge unit may be disposed along a long side. Further, in the embodiments, the hinge unit is a double-axis hinge; but the hinge unit may be a general single axis hinge. Accordingly, the first housing may be formed as a single body with the hinge axis or the pipe member.

Furthermore, in the embodiments recited above, the rails of the slide mechanism are illustrated to be slits; but the shape is modifiable in accordance with the shape of the engagement member; and may be, for example, a rail having a protruded cross section. Also, the faces defining the rail are not limited, and may be formed perpendicular to the pivot axis, for example, on the second housing side face.

Additionally, the first housing and the second housing may be housings having any function. Further, in the embodiments recited above, a switching control of the display function in accordance with the form changes is described; but other function switching of a manner mode, sound level, and the like may be controlled in accordance with the form changes. Furthermore, in the embodiments recited above, a liquid crystal display panel is used as the display unit; but other display apparatus such as an EL or the like may be used.

Also, any appropriate material, shape, number, arrangement etc., of the components may be used; and additionally, the specific structural details, etc., may be, of course, appropriately modified.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2008-052144 filed on Mar. 3, 2008 and including specification, claims, drawings and summary. The disclosure of the above Japanese Patent Application is incorporated herein by reference in its entirety.

What is claimed is:

1. A hinge apparatus comprising:
   a hinge unit that pivotably links a first housing and a second housing about a pivot axis; and
   a slide mechanism that enables the hinge unit to slide with respect to the second housing in a direction perpendicular to the pivot axis of the hinge unit, on one face of the second housing;
   wherein the hinge unit comprises a double-axis hinge that enables the first and second housings to mutually rotate around a rotational axis perpendicular to the pivot axis of the hinge unit.

2. The hinge apparatus according to claim 1, wherein the slide mechanism comprises at least one rail disposed on an upper face of the second housing and the hinge unit engages with the at least one rail and slides along the at least one rail.

3. The hinge apparatus according to claim 1, comprising:
   at least either of a pivot detection unit that detects relative pivot position of the first and second housings around the pivot axis, and a slide detection unit that detects relative slide position of the first and second housings; and
a control unit that controls a predetermined function of electronic circuits contained in the first and second housings in accordance with a detection result of at least either of the pivot detection unit and the slide detection unit.

4. The hinge apparatus according to claim 1, wherein a display unit is provided on an upper face of the first housing.

5. The hinge apparatus according to claim 4, wherein a second display unit is provided on an upper face of the second housing.

6. The hinge apparatus according to claim 1, comprising a rotation detection unit that detects a relative rotation position of the first and second housings around the rotational axis.

7. The hinge apparatus according to claim 6, comprising a control unit that controls a predetermined function of electronic circuits contained in the first and second housings in accordance with a detection result of the rotation detection unit.

8. The hinge apparatus according to claim 1, wherein the slide mechanism enables the hinge unit to be stationary at a position halfway through a slide stroke thereof.

9. The hinge apparatus according to claim 1, wherein the hinge unit enables the first and second housings to pivot at any position of a slide stroke thereof.

10. The hinge apparatus according to claim 2, wherein a lead wire provided between the first and second housings passes through the at least one rail.

11. The hinge apparatus according to claim 10, wherein the lead wire passes through the hinge unit.

12. A portable electronic device comprising the first and second housings and the hinge apparatus, which are as set forth in claim 1.

* * * * *